United States Patent
Agarwal et al.

(10) Patent No.: US 9,632,853 B2
(45) Date of Patent: *Apr. 25, 2017

(54) VIRTUALIZING INTEGRATED CALLS TO PROVIDE ACCESS TO RESOURCES IN A VIRTUAL NAMESPACE

(71) Applicant: Microsoft Technology Licensing, LLC, Redmond, WA (US)

(72) Inventors: Abhishek Agarwal, Redmond, WA (US); Doug Mangini, Bothell, WA (US); Patrick Davis, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/809,701

(22) Filed: Jul. 27, 2015

(65) Prior Publication Data

US 2015/0331730 A1    Nov. 19, 2015

Related U.S. Application Data

(63) Continuation of application No. 13/481,189, filed on May 25, 2012, now Pat. No. 9,092,235.

(51) Int. Cl.

| | |
|---|---|
| *G06F 9/46* | (2006.01) |
| *G06F 9/54* | (2006.01) |
| *G06F 9/50* | (2006.01) |
| *G06F 9/44* | (2006.01) |
| *G06F 9/455* | (2006.01) |

(52) U.S. Cl.
CPC ............ *G06F 9/547* (2013.01); *G06F 9/4425* (2013.01); *G06F 9/455* (2013.01); *G06F 9/5011* (2013.01); *G06F 9/54* (2013.01)

(58) Field of Classification Search
None
See application file for complete search history.

(56) References Cited

U.S. PATENT DOCUMENTS

| | | |
|---|---|---|
| 7,152,090 B2 | 12/2006 | Amirisetty et al. |
| 7,206,819 B2 | 4/2007 | Schmidt |
| 7,467,381 B2 | 12/2008 | Madukkarumukumana et al. |
| 7,962,918 B2 | 6/2011 | Schaefer et al. |
| 8,224,994 B1 * | 7/2012 | Schneider ............ G06Q 30/02 709/217 |

(Continued)

FOREIGN PATENT DOCUMENTS

CN    101344860 A    1/2009

OTHER PUBLICATIONS

Li et al. "VMInsight: Hardware Virtualization-based Process Security Monitoring System", 2011 IEEE, pp. 62-66.*

(Continued)

*Primary Examiner* — Van Nguyen

(57) ABSTRACT

Disclosed herein are systems, methods, and software for facilitating the integration of native applications and virtualized applications. Calls initiated from within a native application associated with a native namespace are monitored for integrated calls. The integrated calls involve resources accessible through a virtual namespace. Upon detecting an integrated call, the integrated call is provided with access to a corresponding resource by way of the virtual namespace.

16 Claims, 4 Drawing Sheets

(56) References Cited

U.S. PATENT DOCUMENTS

| | | | | |
|---|---|---|---|---|
| 8,281,009 | B2* | 10/2012 | Kamei | H04L 61/1582 709/223 |
| 8,489,708 | B2 | 7/2013 | Sheehan et al. | |
| 8,612,565 | B2* | 12/2013 | Schneider | G06Q 30/02 709/203 |
| 8,825,984 | B1* | 9/2014 | Srinivasan | G06F 12/1027 711/206 |
| 2004/0098724 | A1 | 5/2004 | Demsey et al. | |
| 2004/0098731 | A1 | 5/2004 | Demsey et al. | |
| 2005/0102370 | A1 | 5/2005 | Lin et al. | |
| 2007/0192818 | A1 | 8/2007 | Bourges-Sevenier et al. | |
| 2007/0233880 | A1 | 10/2007 | Nieh et al. | |
| 2008/0016514 | A1 | 1/2008 | Demsey et al. | |
| 2008/0307414 | A1 | 12/2008 | Alpern et al. | |
| 2009/0133018 | A1 | 5/2009 | Kaneki | |
| 2010/0318997 | A1 | 12/2010 | Li et al. | |
| 2011/0185043 | A1 | 7/2011 | Zeller et al. | |
| 2011/0197184 | A1 | 8/2011 | Sheehan | |
| 2011/0219365 | A1 | 9/2011 | Foxman et al. | |
| 2011/0246617 | A1 | 10/2011 | Sheehan et al. | |

OTHER PUBLICATIONS

Hanka et al. "Security Analysis of the Cryptographic Namespace Design in Next Generation Internet Architectures", 2011 IEEE, 6 pages.*

Microsoft Corporation; "Click-to-Run: Introduction;" Sep. 1, 2010; pp. 1-3; Microsoft Corporation; http://office.microsoft.com/en-us/outlook-help/click-to-run-introduction-HA101850493.aspx.

Microsoft Corporation; "Virtual Application Management with Microsoft Application Virtualization 4.5/4.6 and System Center Configuration Manager 2007 R2;" White Paper Descriptor; Mar. 2, 2012; pp. 1-54; Microsoft Corporation; http://download.microsoft.com/download/f/7/8/f784a197-73be-48ff-83da-4102c05a6d44/APP-V/App-V_and_ConfigMgr_Whitepaper_Final.docx.

Rabi Prasad Padhy, et al.; "Virtualization Techniques & Technologies: State-of-the-Art;" Journal of Global Research in Computer Science; Dec. 2011; pp. 1-15; vol. 2, No. 12; Journal of Global Research in Computer Science, http://www.jgrcs.info/index.php/jgrcs/article/download/269/233.

Hariharan Kolam; "Applications and Enhancements of Featherweight Virtual Machine (FVM);" Thesis; May 2008; pp. 1-36; http://www.ecsl.cs.sunysb.edu/tr/fvmThesis.pdf.

Manuel Sohner; "Application Virtualization on Windows 7 with Microsoft App-V;" Bachelor's thesis in computer science; Nov. 15, 2011; pp. 1-112; http://www.os.in.tum.de/fileadmin/w00bdp/www/Lehre/Abschlussarbeiten/Manuel_Soehner_-_Bachelorarbeit_Applikationsvirtualisierung_unter_Windows_7_mit_App-V.pdf.

"International Search Report", Mailed Date: Jul. 31, 2013, Application No. PCT/US2012/041479, Filed Date: May 17, 2013, pp. 10.

"Office Action Issued in European Patent Application No. 13726068.3", Mailed Date: Feb. 9, 2016, 3 Pages.

"Office Action Issued in Taiwanese Patent Application No. 102114226", Mailed Date: Oct. 27, 2016, 9 Pages.

"First Office Action and Search Report Issued in Chinese Patent Application No. 201380027445.2", Mailed Date: Oct. 11, 2016, 14 Pages.

"Final Office Action Issued in U.S. Appl. No. 13/481,189", Mailed Date: Sep. 25, 2014, 13 Pages.

"Non-Final Office Action Issued in U.S. Appl. No. 13/481,189", Mailed Date: Mar. 13, 2014, 14 Pages.

"Notice of Allowance Issued in U.S. Appl. No. 13/481,189", Mailed Date: Mar. 17, 2015, 16 Pages.

"International Preliminary Report on Patentability Issued in PCT Patent Application No. PCT/US2013/041479", Mailed Date: Dec. 4, 2014, 8 Pages.

* cited by examiner

VIRTUALIZING INTEGRATED CALLS TO PROVIDE ACCESS TO RESOURCES IN A VIRTUAL NAMESPACE

RELATED APPLICATIONS

This application is a continuation of, and claims priority to, U.S. patent application Ser. No. 13/481,189, filed on May 25, 2012 and issued on Jul. 28, 2015 as U.S. Pat. No. 9,092,235, which are hereby incorporated by reference in their entirety.

TECHNICAL BACKGROUND

Application virtualization has gained increasing acceptance as a useful technique for providing software applications. Application virtualization allows an application to be installed to and run from within a virtualization environment, thereby isolating the application from a host operating system and other natively installed applications. However, the interaction between native applications and virtualized applications presents many challenges, among them the ability for components within native applications to access resources within virtual environments.

When a software component is loaded within a native application, the component has visibility into the native namespace associated with the native application. However, the component may need to interact with a resource that is not available through the native namespace, but rather is accessed through a virtual namespace associated with the virtual environment. In an example, an active control within a web browser may make a call to a virtualized application that fails because the active control does not have access to the virtual namespace through which the virtualized application can be accessed.

One approach to improve the integration of native applications with virtual environments has involved proxies registered in place of the various components requiring access to the virtual namespace. Invoking a particular component, such as a control, would launch a proxy in its place capable of accessing the virtual namespace. The proxy would then load the original component within the virtual environment.

OVERVIEW

Provided herein are systems, methods, and software for facilitating the integration of components within native applications with virtualized environments. Calls initiated from within a native application associated with a native namespace are monitored for integrated calls. The integrated calls involve resources accessible through a virtual namespace. Upon detecting an integrated call, the integrated call is provided with access to a corresponding resource by way of the virtual namespace.

This Overview is provided to introduce a selection of concepts in a simplified form that are further described below in the Technical Disclosure. It should be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DISCLOSURE

Implementations described herein provide for improved integration between native applications and virtualized applications. In particular, a virtualization involves examining calls initiated by components running within native applications to identify integrated calls. Integrated calls are those calls initiated by components loaded in a native namespace but that require access to resources reachable through a virtual namespace. Upon identifying an integrated call, the integrated call is given access to the virtual namespace so that the resource can be leveraged for the native application.

In an example involving a media management application, the media management application includes a control component for importing contacts from a communication application, such as email, into the media management application. In this example, the media management application is installed to and runs within a native environment and namespace, while the communication application is installed within a virtualized environment.

In order for the control component to gain access to the contacts, the control component needs access to the virtual namespace in the virtualized environment. However, the control component would not normally have visibility into the virtual namespace. In a departure, as the control component makes calls to various resources, both within the native environment and within the virtual environment, a virtualization process monitors the calls for integrated calls that require access to resources within the virtual environment, such as a data structure containing the contacts.

Upon detecting an integrated call, the virtualization process provides access to the virtual namespace so that the integrated call can be resolved. For instance, the contacts can be retrieved from the virtual environment and loaded into the native application. The virtualization process can optionally be terminated upon the control component handing control back to the native application. In addition, the virtualization process can be launched the next time the control component is invoked.

While the foregoing example involved a media management application and a control component, it should be understood that the virtualization process may apply to other types of applications and to other types of components as well. Examples of other native applications having virtualizable components integrated within them include web browsing applications, productivity applications, social networking applications, and gaming applications, as well as any other type of application suitable for execution within a native environment. Examples of virtualizable components include, but are not limited to, control components, interface components, and driver components, as well as many other types of components.

Figure 2:
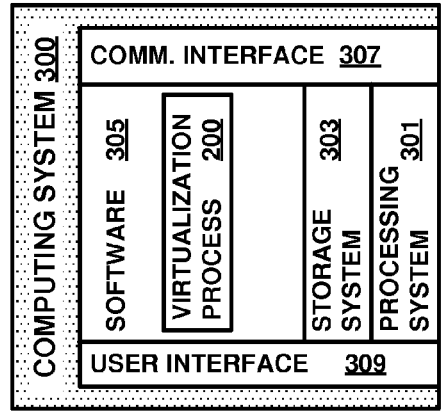
FIG. 2 illustrates a virtualization process employed within an integrated environment in an implementation.
Figure 3:
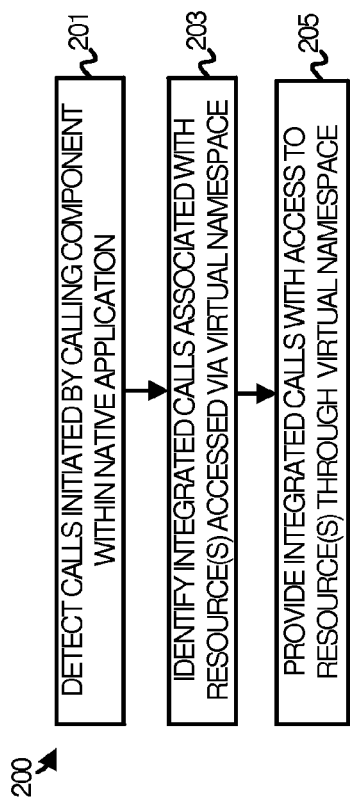
FIG. 3 illustrates a computing system for implementing a virtualization process in an integrated environment.
Figure 1:
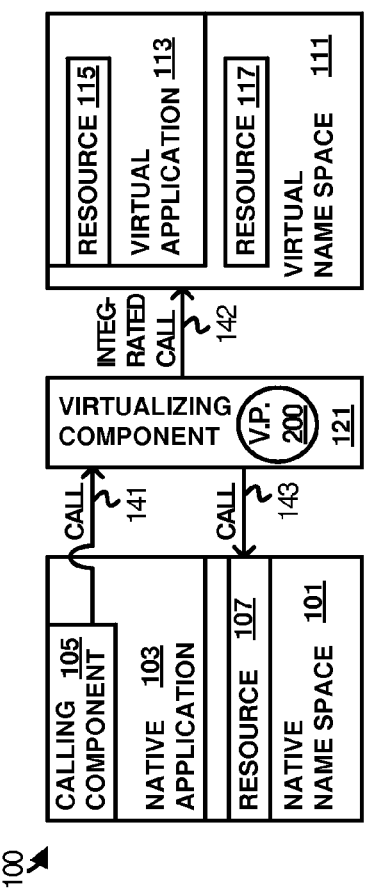
FIG. 1 illustrates an integrated environment in an implementation in which a virtualization process is employed.

Turning now to the drawings, FIGS. 1-3 illustrate an implementation of a virtualization process. In particular, FIG. 1 illustrates an integrated environment within which a virtualization process may be implemented. FIG. 2 illustrates steps involved in the virtualization process, while FIG. 3 illustrates a computing system in which the integrated environment and the virtualization process may be implemented.

Figure 4:
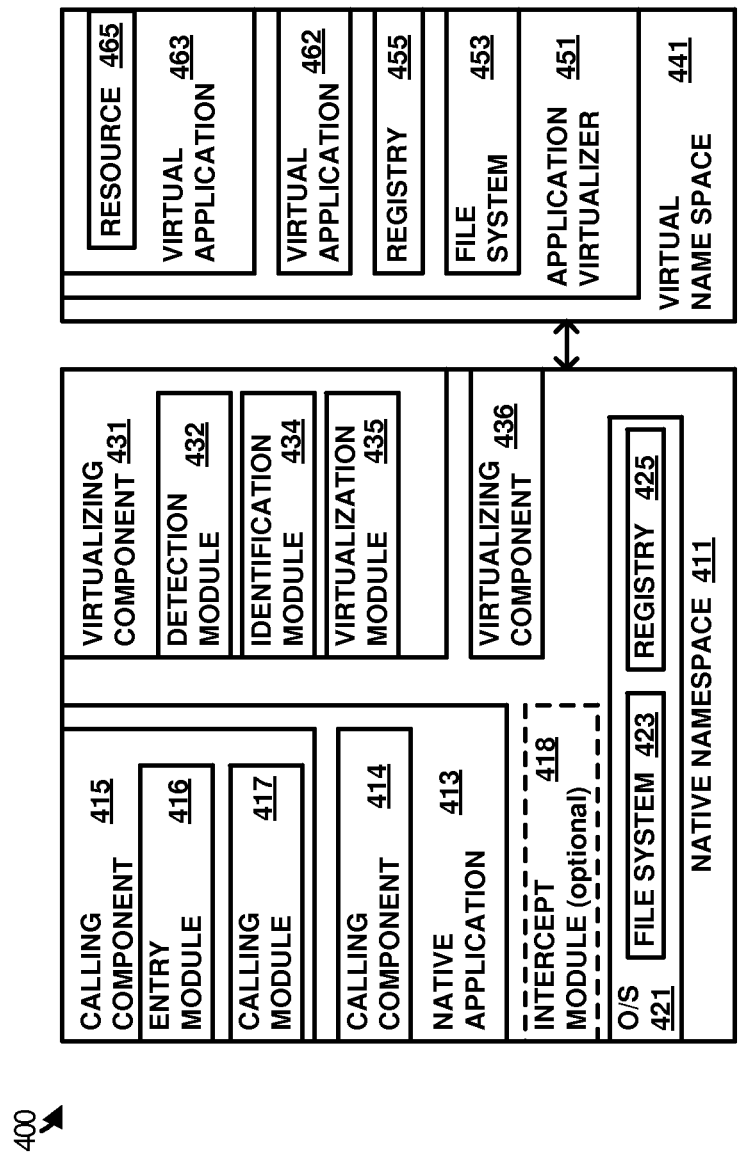
FIG. 4 illustrates a computing environment within which a virtualization process may be employed in an implementation.
Figure 5:
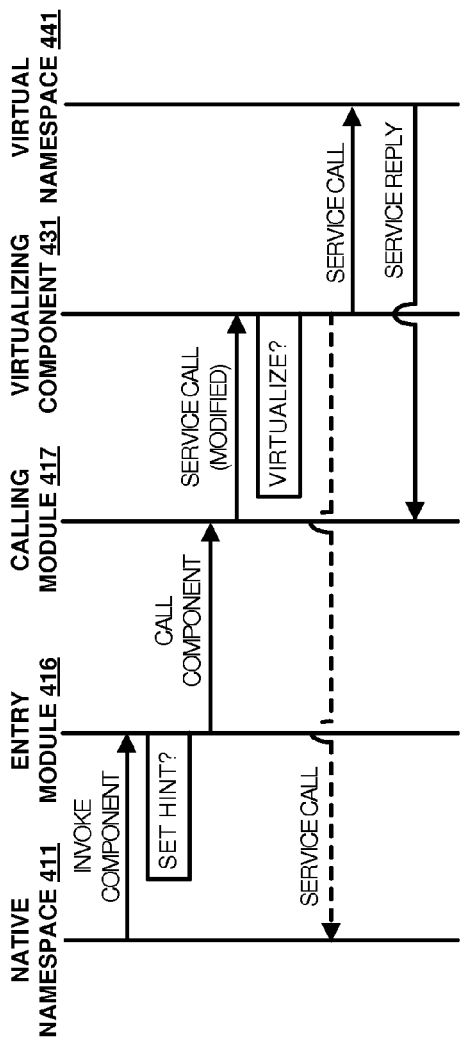
FIG. 5 illustrates a flow diagram describing the interaction between elements within a computing environment employing a virtualization process in an implementation.
Figure 6:
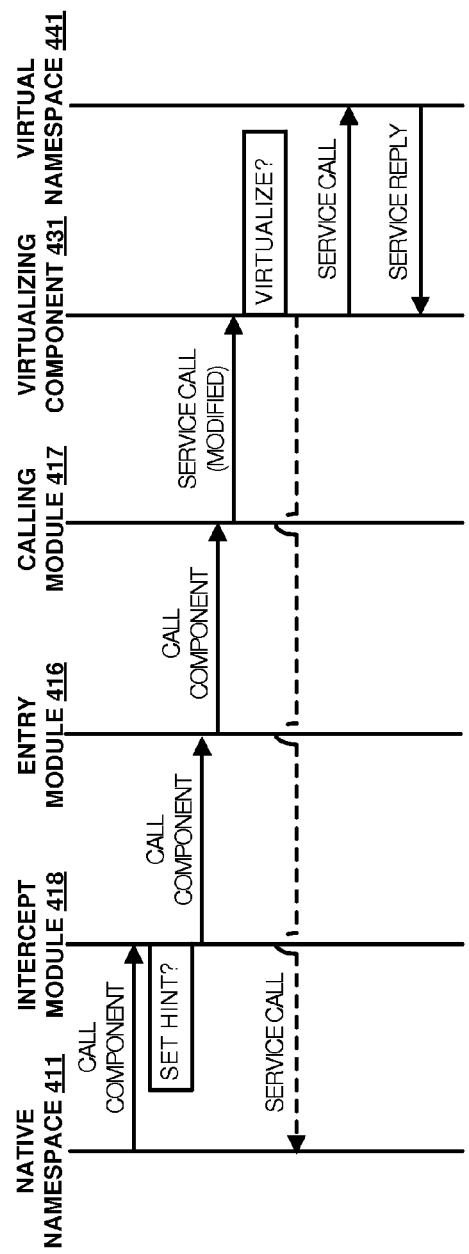
FIG. 6 illustrates a flow diagram describing the interaction between elements within a computing environment employing a virtualization process in an implementation.
Figure 7:
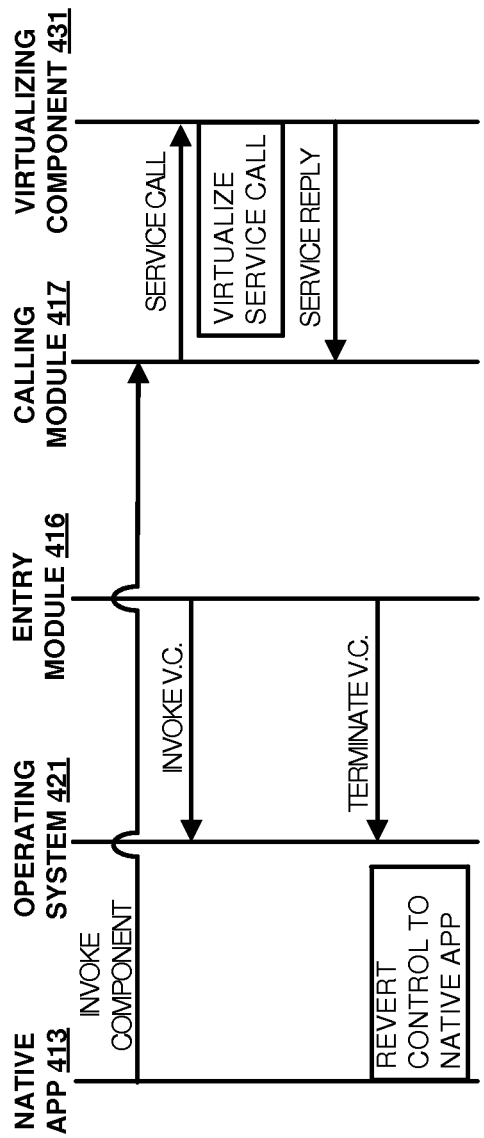
FIG. 7 illustrates a flow diagram describing the interaction between elements within a computing environment employing a virtualization process in an implementation.

FIGS. 4-7 illustrate another implementation of a virtualization process. In particular, FIG. 4 illustrates another integrated environment within which a virtualization process may be implemented, while FIGS. 5-7 illustrate the interaction between various elements of the integrated environment when implementing the virtualization process.

Referring now to FIG. 1 in detail, integrated environment 100 includes native namespace 101, virtual namespace 111, and virtualizing component 121. Native application 103 and resource 107 are accessible through native namespace 101. Native application 103 includes calling component 105. Virtual application 113, including resource 115, and resource 117 are accessible through virtual namespace 111. Virtualizing component 121, while illustrated as external to native namespace 101, may or may not be accessed via native namespace 101. Virtualizing component 121 allows for calling component 105 to access virtual namespace 111, as will be discussed in more detail below with respect to FIG. 2.

Native application 103 is any application program capable running within native namespace 101 and loading components that can be virtualized, such as calling component 105. Examples of native application 103 include media management applications, web browsing applications, productivity applications (such as word processor, spreadsheet, and presentation applications), communication applications (such as email, telecommunication, video chat, and instant messaging applications), and gaming applications.

Calling component 105 is any component capable of being integrated within native application 103 and being virtualized, so as to gain access to virtual namespace 111. Examples of calling component 105 include control components, interface components, and driver components, as well as many other types of components.

Resource 107 is any resource capable of being accessed through native namespace 101. Examples of resource 107 include other application programs, operating system components, and data files, as well as any other type of resource accessible via native namespace 101.

Virtual application 113 is any application program accessed through virtual namespace 111. It should be understood that virtual application 113 can be any application program but is referred to as virtual because it is accessed through virtual namespace 111. Examples of virtual application 113 include media management applications, web browsing applications, productivity applications (such as word processor, spreadsheet, and presentation applications), communication applications (such as email, telecommunication, video chat, and instant messaging applications), streamlining applications, and gaming applications, as well as any combination or variation thereof. Resource 115 comprises any resource capable of being integrated with virtual application 113 and being accessed through virtual namespace 111. Examples of resource 115 include sub-components of virtual application 113, data files associated with virtual application 113, and communication or object components associated with virtual application 113.

Resource 117 is any resource capable of being accessed through virtual namespace 111. Examples of resource 117 include other application programs, operating system components (such as file system and registry components), and data files, as well as any other type of resource accessible via virtual namespace 111.

In operation, native application 103 may invoke calling component 105. Calling component 105 is referred to as such because it is capable of making calls that involve other software components in order to provide a service to native application 103. The calls made by calling component 105 may or may not require access to virtual namespace 111. For instance, some calls may require access to resource 107 or to other resources (not shown) through native namespace 111, while other calls may require access through virtual namespace 111, such as those to virtual application 113, resource 115, or resource 117. The calls may be made directly to those other components, although it should be understood that an intermediate layer or succession of calls may be made to effect inter-component communication.

Calls made by calling component 105 to other components accessible through native namespace 101 can be readily executed because calling component 105, being integrated in and loaded by native application 103, has visibility into native namespace 101. However, without having visibility into virtual namespace 111, calls made to virtual application 113, resource 115, or resource 117 would fail.

In an advance, virtualizing component 121 performs virtualizing process 200 to virtualize those calls made by calling component 105 that need access to virtual namespace 111, herein referred to as integrated calls. Referring now to FIG. 2, virtualizing component 121 monitors calls made by native application 103 and detects those calls 141 initiated by calling component 105 (step 201). It should be noted that native application 103 may include other components (not shown) that make calls. However, virtualizing component 121 is capable of monitoring for just those calls made by calling component 105. In other words, not all components integrated within native application 103 need be monitored for calls that can be virtualized. Virtualizing component 121 may be linked exclusively with calling component 105, although it should be understood that virtualizing component 121 may be linked to multiple other calling components.

Next, virtualizing component 121 examines the calls 141 initiated by calling component 105 for any integrated calls that may require access to virtual namespace 111 (step 203). In one example, integrated calls are identified by a virtualization hint set on threads associated with the calls, the presence of which identifies the calls as requiring virtualization. It should be understood that the hint is an inheritable aspect that may be inheritable by other threads created by the threads associated with the calls. In another example, information referenced by the call itself may be processed to determine whether or not the call should be virtualized. For instance, the identity of particular resource referenced by a call made by calling component 105 may imply that the call should be virtualized. It should be understood that other techniques for identifying integrated calls may be employed and should not be limited to just those disclosed herein.

Upon detecting an integrated call 142, virtualizing component 121 provides access to resources through virtual namespace 111 in order to resolve the integrated call (step 205). Providing access to virtual namespace 111 may be accomplished by performing a renaming operation so that any resource identified by the integrated call 142 can be located within virtual namespace 111. Another technique involves detouring the integrated call. Yet other techniques for providing integrated calls access to virtual namespace 111 are possible and should not be limited to those disclosed herein. Any other call 143 that does not require access to virtual namespace 111 can be forwarded to native namespace 101 for resolution.

Referring now to FIG. 3, computing system 300 and the associated discussion are intended to provide a brief, general description of a suitable computing environment in which virtualization process 200 and integrated environment 100 may be implemented. Examples of computing system 300 include personal computers, server computers, client computers, mobile computers, media devices, Internet appliances, desktop computers, laptop computers, tablet computers, notebook computers, mobile phones, smart phones, and personal digital assistants, as well as any combination or variation thereof.

Computing system 300 includes processing system 301, storage system 303, software 305, communication interface 307, and user interface 309. Processing system 301 is operatively coupled with storage system 303, communication interface 307, and user interface 309. Processing system 301 loads and executes software 305 from storage system 303, including virtualization process 200. When executed by computing system 300 in general, and processing system 301 in particular, software 305 directs computing system 300 to operate as described herein for virtualization process 200.

Referring still to FIG. 3, processing system 301 may comprise a microprocessor and other circuitry that retrieves and executes software 305 from storage system 303. Processing system 301 may be implemented within a single processing device but may also be distributed across multiple processing devices or sub-systems that cooperate in executing program instructions. Examples of processing system 301 include general purpose central processing units, application specific processors, and logic devices, as well as any other type of processing device, combinations of processing devices, or variations thereof.

Storage system 303 may comprise any storage media readable by processing system 301 and capable of storing software 305. Storage system 303 may include volatile and nonvolatile, removable and non-removable media implemented in any method or technology for storage of information, such as computer readable instructions, data structures, program modules, or other data. Storage system 303 may be implemented as a single storage device but may also be implemented across multiple storage devices or subsystems. Storage system 303 may comprise additional elements, such as a controller, capable of communicating with processing system 301.

Examples of storage media include random access memory, read only memory, magnetic disks, optical disks, flash memory, virtual memory, and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media. It should be understood that in no case is the storage media a propagated signal.

Software 305 includes virtualizing component 121 from FIG. 1, which implements virtualization process 200 described with respect to FIG. 2. Virtualizing component 121 may be implemented in computer program instructions, such as detection instructions, identification instructions, and virtualization instructions. The detection instructions may, when executed by computing system 300, direct computing system 300 to detect calls that are initiated from within native application 103 associated with native namespace 101. The identification instructions may then, when executed by computing system 300, direct computing system 300 to process each of the calls to identify at least one integrated call associated with a resource accessible through virtual namespace 111. The virtualization instructions may, when executed by computing system 300, direct computing system 300 to provide the integrated call with access to the resource through virtual namespace 111.

Software 305 may include additional processes, programs, or components in addition to virtualizing component 121, such as native application 103, calling component 105, resource 107, virtual application 113, resource 115, and resource 117, as well as operating system software or other application software. Software 305 may also comprise firmware or some other form of machine-readable processing instructions capable of being executed by processing system 301.

In general, software 305 may, when loaded into processing system 301 and executed, transform processing system 301, and computing system 300 overall, from a general-purpose computing system into a special-purpose computing system customized to facilitate the integration of native applications with virtualized applications and other resources accessible via virtual namespaces as described herein for each implementation.

Indeed, encoding software 305 on storage system 303 may transform the physical structure of storage system 303. The specific transformation of the physical structure may depend on various factors in different implementations of this description. Examples of such factors may include, but are not limited to the technology used to implement the storage media of storage system 303 and whether the computer-storage media are characterized as primary or secondary storage.

For example, if the computer-storage media are implemented as semiconductor-based memory, software 305 may transform the physical state of the semiconductor memory when the program is encoded therein. For example, software 305 may transform the state of transistors, capacitors, or other discrete circuit elements constituting the semiconductor memory.

A similar transformation may occur with respect to magnetic or optical media. Other transformations of physical media are possible without departing from the scope of the present description, with the foregoing examples provided only to facilitate this discussion.

It should be understood that computing system 300 is generally intended to represent a computing environment in which virtualization process 200 could be deployed and executed. However, computing system 300 may also represent a computing environment in which at least virtualizing component 121 may be staged and from which virtualizing component 121 may be transported, downloaded, or otherwise provided to another computing system, similar to computing system 300, for execution.

Referring again to FIG. 1 and FIG. 2, through the operation of computing system 300 employing software 305, and virtualizing component 121 in particular, transformations may be performed with respect to integrated environment 100. As an example, computing system 300 could be considered transformed from one state to another by the handling of integrated call 142, selectively triggered by the operation of virtualizing component 121. In other words, in a first state, calling component 105 does not have access to virtual namespace 111. Upon detecting integrated call 142, virtualizing component 121 provides calling component 105, or at least integrated call 142, with access to resources through virtual namespace 111, thereby changing computing system 300 to a second, different state.

Referring again to FIG. 3, communication interface 307 may include communication connections and devices that allow for communication between computing system 300 and other computing systems (not shown) over a communication network or networks. Examples of connections and devices that together allow for inter-system communication include network interface cards, antennas, power amplifiers, RF circuitry, transceivers, and other communication circuitry. The aforementioned network, connections, and devices are well known in the art and need not be discussed at length here.

User interface 309 may include a mouse, a voice input device, a touch input device for receiving a gesture from a user, a motion input device for detecting non-touch gestures and other motions by a user, and other comparable input devices and associated processing elements capable of receiving user input from a user. Output devices such as a display, speakers, printer, haptic devices, and other types of output devices may also be included in user interface 309. The aforementioned user input devices are well known in the art and need not be discussed at length here.

Turning now to FIGS. 4-7, another virtualization implementation is illustrated. In particular, FIG. 4 illustrates integrated environment 400 within which the virtualization process may be implemented, while FIGS. 5-7 illustrate the interaction between various elements of integrated environment 400.

Integrated environment 400 illustrates various software elements that may be implemented on a general purpose computing system, such as computing system 300 illustrated in FIG. 3. Integrated environment 400 includes native namespace 411 through which native application 413 may be accessed by other applications, processes, or components. Integrated environment 400 also includes virtualizing component 431, which may also be accessed through native namespace 411. At least some portions of operating system 421 may also be accessed through native namespace 411, such as file system 423 and registry 425. However, it should be understood that in some implementations some portions of operating system 421 may not be accessible via native namespace 411. Integrated environment 400 may optionally include intercept module 418 in some implementations, as will be discussed in more detail below.

Native application 413 includes calling component 414 and calling component 415 and may include many other program modules, components, or code that together function to implement native application 413. Calling component 415 includes entry module 416 and calling module 417. It should be understood that calling component 415 may also include other program modules, components, or code. It should also be understood that calling component 414 is merely optional. Virtualizing component 431 includes detection module 432, identification module 434, and virtualization module 435. It should be understood that virtualizing component 431 may also include other program modules, components, or code.

Integrated environment 400 also includes virtual namespace 441, through which virtual application 462, virtual application 463, and resource 465 may be accessed. At least some portions of application virtualizer 451, such as file system 453 and registry 455, may also be accessed through virtual namespace 441. However, it should be understood that in some implementations some portions of application virtualizer 451 may not be accessible via virtual namespace 441. In addition, some portions of application virtualizer 451 may be accessible through native namespace 411.

Native namespace 411 is representative of a naming context shared between a set of application programs, application components, component objects, or any other software element that may be considered natively loaded, installed, or otherwise established, that allows each software element within native namespace 411 to reference other software elements within native namespace 411 in the same way, such as by using the same name, same location, or same combination or variation of name and location. For example, a file system call made by native application 413 to file system 423 would identify file system 423 in the same way as would a file system call to file system 423 made by virtualizing component 431.

In contrast, virtual namespace 441 is representative of a different naming context shared between a set of application programs, application components, component objects, or any other software element that may be considered virtually loaded, virtually installed, or otherwise virtually established, that allows each software element within virtual namespace 441 to reference other elements within virtual namespace 441 using the same name, name string, location, or combination or variation of name and location. For example, a file system call made by virtual application 462 to file system 453 would identify file system 453 in the same way as would a file system call to file system 453 made by virtual application 463.

In general, the various application programs, application components, objects, and other software elements that are associated with native namespace 411 are registered with registry 425 so that each software element may find and utilize the other elements within native namespace 411. Similarly, the various software elements within virtual namespace 441 are registered with registry 455 so that each software element may find and utilize the other elements within virtual namespace 441.

Native application 413 is any application program capable running within native namespace 411 and loading components that can be virtualized, such as calling component 414 and calling component 415. Examples of native application 413 include media management applications, web browsing applications, productivity applications (such as word processor, spreadsheet, and presentation applications), communication applications (such as email, telecommunication, video chat, and instant messaging applications), and gaming applications.

Calling component 414 and calling component 415 are any component software elements capable of being integrated within native application 413 and being virtualized, so as to gain access to virtual namespace 441. Examples of calling components 414 and calling component 415 include control components, interface components, and driver components, as well as many other types of components. Entry module 416 handles calls into calling component 415 and may optionally handle exits out of calling component 415. Entry module 416 may also be capable of setting a virtual hint flag on threads created by calling component 415 that indicate to virtualizing component 431 whether or not to virtualize calls made by calling module 417. Calling module 417 handles calls out of calling component 415 to other components or resources, such as files, programs, and objects. Calling component 414 may include similar sub-components as calling component 415. An example of calling component 414 and calling component 415 is a dynamic link library.

Virtualizing component 431 is any software element capable of virtualizing integrated calls made by calling component 415. Virtualizing component 431 may be a stand-alone program or component or may be integrated within other program applications or even native application 413. Virtualizing component 436 is any software element capable of virtualizing calls made by calling component 414. Virtualizing component 436 may be a stand-alone program or component or may be integrated within other program applications or even native application 413. An example of virtualizing component 431 and virtualizing component 436 is a dynamic link library.

It should be understood that while two virtualizing components 431 and 436 are illustrated in FIG. 4, multiple virtualizing components are not required. Rather, each calling component 414 and 415 is configured to, upon being invoked by native application 413, call a virtualizing component that is capable of monitoring for calls from that calling component. In this illustration, it is assumed that virtualizing component 436 is called by and monitors for calls from calling component 414 to be virtualized, while virtualizing component 431 is called by and monitors for calls from calling component 415 to be virtualized.

In that regard, virtualizing component 431 also includes detection module 432, identification module 434, and virtualization module 435. Detection module 432 detects calls that are initiated from within native application 413 by calling module 417. Identification module 434 may then process each of the calls to identify at least one integrated call associated with a resource accessible through virtual namespace 441. For example, identification module 434 may check the value of a virtualization hint flag set by entry module 416 when determining whether or not any particular calls is an integrated call. Virtualization module 435 provides those calls identified as integrated calls with access to virtual namespace 441. The integrated call can then be resolved and a value, response, or some other reply provided to calling component 415. Virtualizing component 436 operates in a similar manner to virtualizing component 431.

As mentioned, intercept module 418 may optionally be present in some implementations. Intercept module 418 is capable of setting the virtual hint flag instead of entry module 416. This may be accomplished by intercept module 418 monitoring for calls made by native application 413 to calling component 415 and setting the virtual hint flag accordingly. Intercept module 418 can then call into calling component 415 by way of entry module 416. Calls initiated by calling component 415 may then be recognized by virtualizing component 431 as requiring virtualization.

It should be understood that, whether set by entry module 416 or intercept module 418, the determination of whether or not to set the virtual hint flag may be statically programmed, but may also be dynamically determined. For instance, calling component 415 may need access to a resource that is initially only available within virtual namespace 441. This may occur in many situations, including when the resource is part of a virtual package installed by application virtualizer 451. However, the resource may subsequently become available through native namespace 411. For example, the same or other applications similar to that in the virtual package may be installed to native namespace 411. Thus, the virtual hint flag may initially be set to trigger virtualization of the call, while later in time the virtual hint flag may be set to identify the call as not needing to be virtualized.

Application virtualizer 451 is any application program or collection of programs capable of virtually installing and virtually running other application programs, components, and code. As mentioned above, application virtualizer 451 may be accessible through both native namespace 411 and virtual namespace 441. In this manner, application virtualizer 451 and its sub-components can communicate with software elements within virtual namespace 441, such as virtual application 463, as well as with software elements within native namespace 411, such as virtualizing component 431.

Virtual application 462 and virtual application 463 are any application programs accessed through virtual namespace 441 capable of being virtualized by application virtualizer 451. It should be understood that virtual application 462 and virtual application 463 may be any type of application program but are referred to as virtual because they are accessed through virtual namespace 441. Examples of virtual application 462 and virtual application 463 include media management applications, web browsing applications, productivity applications (such as word processor, spreadsheet, and presentation applications), communication applications (such as email, telecommunication, video chat, and instant messaging applications), streamlining applications, gaming applications, and any combination or variation thereof.

Resource 465 comprises any resource capable of being integrated with virtual application 463 and being accessed through virtual namespace 441. Examples of resource 465 include sub-components of virtual application 463, data files associated with virtual application 463, and communication or object components associated with virtual application 463. It should be understood that other types of resources are possible. In addition, it should be understood that virtual application 462 may contain resources similar to resource 465.

FIG. 5 is a flow diagram that illustrates the interaction between the various software elements of integrated environment 400 in an implementation. In this implementation, entry module 416 performs the task of setting the virtual flag hint. In contrast, FIG. 6 illustrates an implementation involving intercept module 418.

Referring to FIG. 5, calling component 415 may be called by native application 413. For example, by way of a user input, a graphical representation of calling component 415 may be selected. Upon calling component 415 being invoked, entry module 416 is called from within native namespace 411. Entry module 416 determines whether or not to set the virtual hint flag to indicate the need to virtualize any resulting calls by calling module 417. In this illustration, it is assumed for illustrative purposes that the virtual hint flag is set to the affirmative, meaning that any resulting calls will be virtualized.

Next, calling module 417 is invoked or called, possibly by entry module 416. Calling module 417 launches a service call that is detected by virtualizing component 431. Virtualizing component 431 inspects or otherwise examines the service call to determine if it should be virtualized. Per the value of the virtual hint flag, virtualizing component 431 determines that the call should be virtualized and thus may be considered an integrated call.

Had virtualizing component 431 determined that the call need not be virtualized, the service call could be forwarded to execution in native namespace 411. Here, since the service call is an integrated call and is intended to be virtualized, the service call is provided with access to virtual namespace 441. The service call can thus be resolved using software elements only accessibly by way of virtual namespace 441, such as virtual applications 463 or 462, resource 465, registry 455, or file system 453. A service reply is provided to calling module 417, or possibly to some other element within calling component 415. Control can be returned from calling component 415 to native application 413.

Referring to FIG. 6, calling component 415 may be called by native application 413. For example, by way of a user input, a graphical representation of calling component 415 may be selected. Upon calling component 415 being invoked, intercept module 418 intercepts the call and determines whether or not to set the virtual hint flag to indicate the need to virtualize any resulting calls by calling module 417. In this illustration, it is assumed for illustrative purposes that the virtual hint flag is set to the affirmative, meaning that any resulting calls will be virtualized.

Intercept module 418, upon setting the virtual hint flag, then proceeds to allow the call to proceed into entry module 416. Next, calling module 417 is invoked or called, possibly by entry module 416. Calling module 417 launches a service call that is detected by virtualizing component 431. Virtualizing component 431 inspects or otherwise examines the service call to determine if the call should be virtualized. Per the value of the virtual hint flag, virtualizing component 431 determines that the call should be virtualized and thus may be considered an integrated call.

Had virtualizing component 431 determined that the call need not be virtualized, the service call could be forwarded to execution in native namespace 411. Here, since the service call is to be virtualized, the service call is provided with access to virtual namespace 441. The service call can thus be resolved using software elements only accessibly by way of virtual namespace 441, such as virtual applications 463 or 462, resource 465, registry 455, or file system 453. A service reply is provided to calling module 417, or possibly to some other element within calling component 415. Calling component 415 can then be terminated or control otherwise given back over to native application 413.

Referring to FIG. 7, illustrated is a flow diagram pertaining to how control may be allocated between calling component 415 and native application 413. Upon native application 413 invoking calling component 415, entry module 416 invokes virtualizing component 431. Indeed, as service calls are made by calling module 417, virtualizing component 431 determines which calls are integrated calls and which calls can be resolved without access to virtual namespace 441. The calls are service and service replies are provided to calling module 417, or possibly to some other element within calling component 415. Upon the service calls being resolved, entry module 416 communicates to operating system 421 that virtualizing component 431 should be terminated or control otherwise given over to some other element. Control reverts back to native application 413 or to some other software element within native namespace 411.

In this manner, virtualizing component 431 is initialized and loaded dynamically when calling component 415 is invoked and running and is no longer needed upon calling component 415 resolving any calls. This prevents virtualizing component 431 from running during other periods when calling component 415 is not operating, thereby saving resources. A similar operation may occur with respect to calling component 414 and virtualizing component 436. Namely, virtualizing component 436 may be instantiated in parallel with calling component 414 and terminated upon the resolution of calling component 414.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A computing system comprising:
 a non-transitory storage device having stored therein program instructions for facilitating the integration of components within native applications with virtualized environments; and
 a processing system operatively coupled with the non-transitory storage system that, when executing the program instructions, is directed by the program instructions to at least:
 detect a plurality of calls initiated from within a native application associated with a native namespace;
 process each of the plurality of calls to identify at least one integrated call associated with a resource accessible through a virtual namespace; and
 provide the integrated call with access to the resource through the virtual namespace,
 wherein the resource comprises at least a portion of a virtualized application loaded within the virtual namespace, and
 wherein the portion of the virtualized application comprises a service invoked by the integrated call provided to the native application.

2. The computing system of claim 1 wherein, to process each of the plurality of calls to identify the at least one integrated call, the program instructions direct the processing system to at least check for the presence of a virtualization hint flag on any of a plurality of threads associated with the plurality of calls.

3. The computing system of claim 2 wherein the presence of the virtualization hint flag on a thread of the plurality of threads identifies a call corresponding to the thread as the integrated call.

4. The computing system of claim 3 wherein virtualization hint flag comprises an aspect of the thread inheritable by new threads created from the thread.

5. The computing system of claim 1 wherein the virtualized application comprises a streaming application.

6. One or more non-transitory computer readable storage media having stored therein program instructions executable by a computing system to facilitate the integration of components within native applications and virtualized environments, wherein the program instructions comprise:
   detection instructions that, when executed by the computing system, direct the computing system to detect a plurality of calls initiated from within a native application associated with a native namespace;
   identification instructions that, when executed by the computing system, direct the computing system to process each of the plurality of calls to identify at least one integrated call associated with a resource accessible through a virtual namespace; and
   virtualization instructions that, when executed by the computing system, direct the computing system to provide the integrated call with access to the resource through the virtual namespace,
   wherein the resource comprises at least a portion of a virtualized application loaded within the virtual namespace, and
   wherein the portion of the virtualized application comprises a service invoked by the integrated call provided to the native application.

7. The one or more non-transitory computer readable storage media of claim 6 wherein the program instructions comprise at least a first portion and a second portion, wherein the second portion includes the detection instructions, the identification instructions, and the virtualization instructions, and wherein the first portion includes entry instructions;
   wherein the entry instructions, when executed by the computing system, direct the computing system to load the second portion in response to an event occurring within the native application that invokes the first portion.

8. The one or more non-transitory computer readable storage media of claim 7 wherein the entry instructions, when executed by the computing system, direct the computing system to return control from the second portion to the native application in response to completing the first portion.

9. The one or more non-transitory computer readable storage media of claim 7 wherein the first portion further comprises calling instructions, wherein the calling instructions, when executed by the computing system, direct the computing system to initiate the plurality of calls from within the native application.

10. The one or more non-transitory computer readable storage media of claim 9 wherein the first portion further comprises interception instructions that, when executed by the computing system, direct the computing system to intercept and modify at least one call of the plurality of calls initiated by the calling instructions to identify the one call to the identification instructions as the integrated call.

11. The one or more non-transitory computer readable storage media of claim 10 wherein the interception instructions, to modify the at least one call, direct the computing system to set a virtualization hint flag on a thread associated with the one call.

12. The one or more non-transitory computer readable storage media of claim 9 wherein the first portion comprises a first dynamic link library integrated into the native application and wherein the second portion comprises a second dynamic link library.

13. A method of facilitating the integration of native applications and virtualized applications in computing systems, the method comprising:
   upon invocation of a calling component loaded within a native application in a computing system, loading a virtualization component in the computing system; and
   in the virtualization component, monitoring in the computing system for integrated calls initiated by the calling component from within the native application that require at least one of a plurality of resources accessible through a virtual namespace to be resolved and providing the integrated calls with access to the resource through the virtual namespace,
   wherein the resource comprises at least a portion of a virtualized application loaded within the virtual namespace, and
   wherein the portion of the virtualized application comprises a service invoked by the integrated call provided to the native application.

14. The method of claim 13 wherein monitoring for the integrated calls comprises examining calls initiated by the calling component for a virtualization hint flag set to identify a subset of the calls initiated by the calling component as the integrated calls.

15. The method of claim 14 further comprising, in the calling component, intercepting and setting the virtualization hint flag on a per-call basis prior to examining the calls initiated by the calling component.

16. The method of claim 13 wherein the calling component comprises a first dynamic link library integrated into the native application and wherein the virtualization component comprises a second dynamic link library that is not integrated into the native application.

* * * * *